United States Patent
Mehta et al.

(10) Patent No.: US 7,526,036 B2
(45) Date of Patent: Apr. 28, 2009

(54) SYSTEM AND METHOD FOR TRANSMITTING SIGNALS IN COOPERATIVE BASE STATION MULTI-USER MIMO NETWORKS

(75) Inventors: Neelesh B. Mehta, Needham, MA (US); Hongyuan Zhang, Raleigh, NC (US); Andreas F. Molisch, Arlington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 469 days.

(21) Appl. No.: 11/408,284

(22) Filed: Apr. 20, 2006

(65) Prior Publication Data

US 2007/0248172 A1 Oct. 25, 2007

(51) Int. Cl.
*H04K 1/10* (2006.01)
(52) U.S. Cl. .................................. 375/260; 375/267
(58) Field of Classification Search .......... 455/296, 455/212, 225, 213, 218, 221, 303, 63; 370/329, 370/338, 315, 261; 375/260, 267
See application file for complete search history.

(56) References Cited

U.S. PATENT DOCUMENTS 6,233,443 B1 * 5/2001 Brommer .................... 455/296
2003/0072380 A1 * 4/2003 Huang ........................ 375/261
2007/0165566 A1 * 7/2007 Khan et al. ................. 370/329

OTHER PUBLICATIONS

G. J. Foschini and M. J. Gans, "On limits of wireless communications in a fading environment when using multiple antennas," Wireless Personal Communications, vol. 6, No. 3, pp. 311-335, Mar. 1998.
E. Telatar, "Capacity of multi-antenna Gaussian channels," European Trans. Telecomm., vol. 10, No. 6, pp. 585-595, Nov.-Dec. 1999.
R. S. Blum, J. H. Winters and N. R. Sollenberger, "On the capacity of cellular systems with MIMO," Proc. 2001 Fall IEEE Vehicular Technology Conference, pp. 1220-1224, vol. 2, Atlantic City, Oct. 7-11, 2001.
H. Dai, A. F. Molisch, and H. V. Poor, "Downlink capacity of interference-limited MIMO networks with joint detection," IEEE Trans. Wireless Communications, vol. 3, No. 2, pp. 442-453, Mar. 2004.

(Continued)

*Primary Examiner*—Melody Mehrpour
(74) *Attorney, Agent, or Firm*—Dirk Brinkman Gene Vinokur

(57) ABSTRACT

A method transmits and receives signals in a cooperative, multi-user, multi-input, multi-output network. The network includes base stations (BSs) and mobile stations (MSs). Each BS has at least two antennas, and each MS has at least one antenna. At a first base station and a second base station using linear pre-coding matrices, a plurality of data streams are jointly pre-coded to produce first signals and second signals. The first signals are transmitted synchronously from the first BS and the second BS to a first MS, and the second signals are transmitted synchronously from the first BS and the second BS to a second MS, and in the first signal and the second signal are asynchronous with respect each other.

17 Claims, 8 Drawing Sheets

OTHER PUBLICATIONS

L. Shao and S. Roy, "Downlink Multicell MIMO-OFDM: An Architecture for Next Generation Wireless Networks," Proc. IEEE Wireless Communications and Networking Conference (WCNC), Mar. 2005.

A. Pascual-Iserte, A. I. Perez-Neira, and M. A. Lagunas, "An approach to optimum joint beamforming design in a MIMO-OFDM multi-user system," European Journal on Wireless Communications and Networking, 2004, No. 2, pp. 210-221, 4th Quarter, 2004.

W. Yu, and J. Cioffi, "Trellis pre-coding for the broadcast channel," Proc. IEEE Global Telecommunications Conference, 2001. GLOBECOM 01, vol. 2, pp. 1344-1348, Nov. 2001.

B. L. Ng, J. S. Evans, S. V. Hanly and D. Aktas, "Transmit beamforming with cooperative base stations," Proc. IEEE International Symposium on Information Theory, ISIT 05, pp. 1431-1435, Sep. 2005.

T. M. Lok and T. F. Wong, "Transmitter and receiver optimization in multicarrier CDMA systems," IEEE Trans. Communications, vol. 48, No. 7, pp. 1197-1207, Jul. 2000.

J.-H. Chang, L. Tassiulas, and F. Rashid-Farrokhi, "Joint transmitter receiver diversity for efficient space division multi-access," IEEE Trans.Wireless Communications, vol. 1, No. 1, pp. 16-27, Jan. 2002.

K.-K. Wong, R. S.-K. Cheng, K. B. Letaief, and R. D. Murch "Adaptive antennas at the mobile and base stations in an OFDM/TDMA system," IEEE Trans. Communications, vol. 49, No. 1, pp. 195-206, Jan. 2001.

A Tarighat, M. Sadek, and A. H. Sayed, "A multi user beamforming scheme for downlink MIMO channels based on maximizing signal-to-leakage ratios," Proc. IEEE International Conference on Acoustics, Speech, and Signal Processing (ICASSP), vol. 3, pp. 1129-1132, Philadelphia, PA, Mar. 2005.

H. Dai, L. Mailaender, and H. V. Poor, "CDMA Downlink Transmission with Transmit Antenna Arrays and Power Control in Multipath Fading Channels," European Journal on Wireless Communications and Networking, 3rd quarter, 2004.

S. Serbetli, and A. Yener, "Transceiver optimation for multi-user MIMO systems," IEEE Trans. Signal Processing, vol. 52, pp. 214-226, Jan. 2004.

M. Joham, K. Kusume, M. h. Gzara, W. Utschick, and J. A. Nossek, "Transmit Wiener filter for the downlink of TDD DS-CDMA systems," Proc. IEEE 7th Int. Symp. on Spread-Spectrum tech. and Appl., Prague, Czech Republic, vol. 1, pp. 9-13, Sep. 2002.

Q. H. Spencer, A. L. Swindlehurst, and M. Haardt, "Zero-forcing methods for downlink spatial multiplexing in multi-user MIMO channels," IEEE Trans. Signal Processing, vol. 52, No. 2, pp. 461-471, Feb. 2004.

M .Rudlf and B. Jechoux, "Design of concatenated extended complementary sequences for inter-base station synchronization in WCDMA TDD mode," Proc. IEEE Global Telecommunications Conference, 2001, GLOBECOM 01, vol. 1, pp. 674-679, Nov. 2001.

C. Lagarias, J. A. Reeds, M. H. Wright and P. E. Wright, "Convergence Properties of the Nelder-Mead Simplex Method in Low Dimensions," SIAM Journal of Optimization, vol. 9, No. 1, pp. 112-147, 1998.

\* cited by examiner

Step 1:
For $k = 1, \ldots, K$ determine $\mathbf{T}_1, \ldots, \mathbf{T}_k$ with Equation (21)

Step 2:
For $k = 1, \ldots, K$, by fixing $\{\mathbf{T}_j\}_{j \neq k}$,
set $\mathbf{H}_{k\_equ} = \Phi^{-1/2} \mathbf{H}_k$, and
update the pre-coding matrix $\mathbf{T}_k$ by
eigen-beamforming and water-filling power allocation
based on $\mathbf{H}_{k\_equ}$ with unit noise power.

Step 3:
Determine if a termination condition is reached,
e.g., an increase of a value of the in Equation (8)
is less than a pre-determined threshold, otherwise
repeat step 2.

SYSTEM AND METHOD FOR TRANSMITTING SIGNALS IN COOPERATIVE BASE STATION MULTI-USER MIMO NETWORKS

FIELD OF THE INVENTION

This invention relates generally to multi-input, multi-output (MIMO) communication networks, and more particularly to transmitting signals to reduce inter-cell interference in cooperative base station, multi-user MIMO networks.

BACKGROUND OF THE INVENTION

Spectral efficiency gains in multi-input, multi-output (MIMO) communication networks are significant for point-to-point links. However, the gains are limited in multi-user (transceiver) cellular networks. This is especially so in a downlink from a base station to a transceiver (mobile telephone) of a cellular network, which is also called a vector broadcast channel.

In conventional cellular networks, inter-cell, co-channel interference (CCI) is primarily handled by careful radio resource management techniques such as power control, frequency reuse, and assignments of spreading codes.

In recent years, a number of more advanced techniques that outperform conventional approaches have been described to reduce the effect of CCI in cellular MIMO networks. For example, multi-user detection (MUD) in mobile stations (MSs) offers considerable performance improvements, H. Dai, A. F. Molisch and H. V. Poor, "Downlink capacity of interference-limited MIMO networks with joint detection," IEEE Trans. Wireless Communications, vol. 3, no. 2, pp. 442-453, March 2004. However, MUD is prohibitively complex for most practical networks.

In conventional single-cell transmission networks, where the signal intended for only one MS is transmitted from only one associated base station (BS), joint pre-coding optimizations among coordinated BSs has been described, A. Pascual-Iserte, A. I. Perez-Neira and M. A. Lagunas, "An approach to optimum joint beamforming design in a MIMO-OFDM multi-user system," European Journal on Wireless Communications and Networking, 2004, no. 2, pp. 210-221, $4^{th}$ Quarter, 2004; and C. Windpassinger, R. F. H. Fischer, T. Vencel and J. B. Huber, "Pre-coding in multiantenna and multi-user communications," IEEE Trans. Wireless Commun., vol. 3, no. 4, pp. 1305-1316, July 2004.

However, very stringent dimension constraints severely limit the number of transceivers that can be handled by such networks. While joint pre-coding significantly increases the network complexity, its performance gains are limited. Dirty paper coding (DPC), when used for the joint transmission among all the cooperative base stations, can effectively eliminate the effect of CCI, A. F. Molisch, Wireless Communications, Wiley, 2005; A. Goldsmith, S. A. Jafar, N. Jindal and S. Vishwanath, "Capacity limits of MIMO channels," IEEE J. Select. Areas Commun., vol. 21, no. 5, pp. 684-702, June 2003; and S. Shamai and B. M. Zaidel, "Enhancing the cellular downlink capacity via co-processing at the transmission end," Proc. 2001 Spring IEEE Vehicular Technology Conf., pp. 1745-1749, May 2001.

Tomlinson-Harashima pre-coding (THP), which yields results that are only slightly suboptimal, is another practical solution, A. Pascual-Iserte, A. I. Perez-Neira and M. A. Lagunas, "An approach to optimum joint beamforming design in a MIMO-OFDM multi-user system," European Journal on Wireless Communications and Networking, 2004, no. 2, pp. 210-221, $4^{th}$ Quarter, 2004; and C. Windpassinger, R. F. H. Fischer, T. Vencel and J. B. Huber, "Pre-coding in multiantenna and multi-user communications," IEEE Trans. Wireless Communication., vol. 3, no. 4, pp. 1305-1316, July 2004.

However, both DPC and THP are nonlinear pre-coding techniques, and are prohibitively complicated for cooperative BS MIMO networks. Therefore, linear pre-coding at the transmitter among cooperative BSs is an attractive solution given its relatively lower complexity requirements at both the BSs and the MSs, S. Shamai and B. M. Zaidel, "Enhancing the cellular downlink capacity via co-processing at the transmission end," Proc. 2001 Spring IEEE Vehicular Technology Conf., pp. 1745-1749, May 2001; G. J. Foschini, H. Huang, K. Karakayali, R. A. Valenzuela and S. Venkatesan, "The value of coherent base station coordination," Proc. 2005 Conference on Information Sciences and Systems (CISS 05), The Johns Hopkins University, Mar. 16-18, 2005; P. W. Baier, M. Meurer, T. Weber and H. Troeger, "Joint transmission (JT), an alternative rationale for the downlink of time division CDMA using multi-element transmit antennas," Proc. 2000 IEEE 6th Int. Symp. Spread Spectrum Techniques, vol. 1, pp. 1-5, September. 2000; and B. L. Ng, J. S. Evans, S. V. Hanly and D. Aktas, "Transmit beamforming with cooperative base stations," Proc. IEEE International Symposium on Information Theory, ISIT 05, pp. 1431-1435, September 2005.

Joint transmission among cooperative base stations not only reduces CCI effectively, but also exploits macro-diversity, and can avoid capacity bottlenecks in channels with severe spatial correlations. However, conventional joint transmission schemes invariably assume that both the desired signals and the interfering signals from different BSs arrive at each of the MSs synchronously. While this assumption enables the well-studied single cell downlink transmission model to be applied in a straightforward manner, it is fundamentally unrealizable in practical networks.

The BSs can align their transmissions so that the signals intended for any MS arrive at that MS synchronously. However, the BSs cannot also simultaneously control when these signals are also received as interference by other MSs. Thus, the interference signals do not arrive simultaneously at the MSs, even under the assumption of accurate synchronous BS cooperation. The impact of this inherent asynchronism is readily apparent in high data rate networks. It can significantly degrade the performance of the networks. Even the multi-BS pre-coding optimization, in which a linearly pre-coded signal for an MS is transmitted by only one BS, ignores the asynchronous arrival of interference signals.

To the best of our knowledge, this problem of asynchronous interference in multi-user MIMO networks has not been addressed in the prior art.

SUMMARY OF THE INVENTION

The embodiments of the invention provide methods and systems for transmitting signals in cooperative base station, multi-user, multi-input, multi-output (MIMO) communications networks using linear pre-coding processes to reduce inter-cell interference.

The embodiments can also reduce timing advance inaccuracies or 'jitter,' which are inevitable in practical networks. By using jitter statistic-aware pre-coders, the impact of these timing advance inaccuracies can be significantly reduced.

In general, the invention enables the implementation of joint transmission in cooperative base station, multi-user MIMO networks.

BRIEF DESCRIPTION OF THE DRAWINGS

FIG. 3 is block diagram of a method for optimizing a received signal at a mobile station of the network of FIG. 1 according to an embodiment of the invention;

DETAILED DESCRIPTION OF THE PREFERRED EMBODIMENTS

Network Model and Problem Formulation

Figure 1:
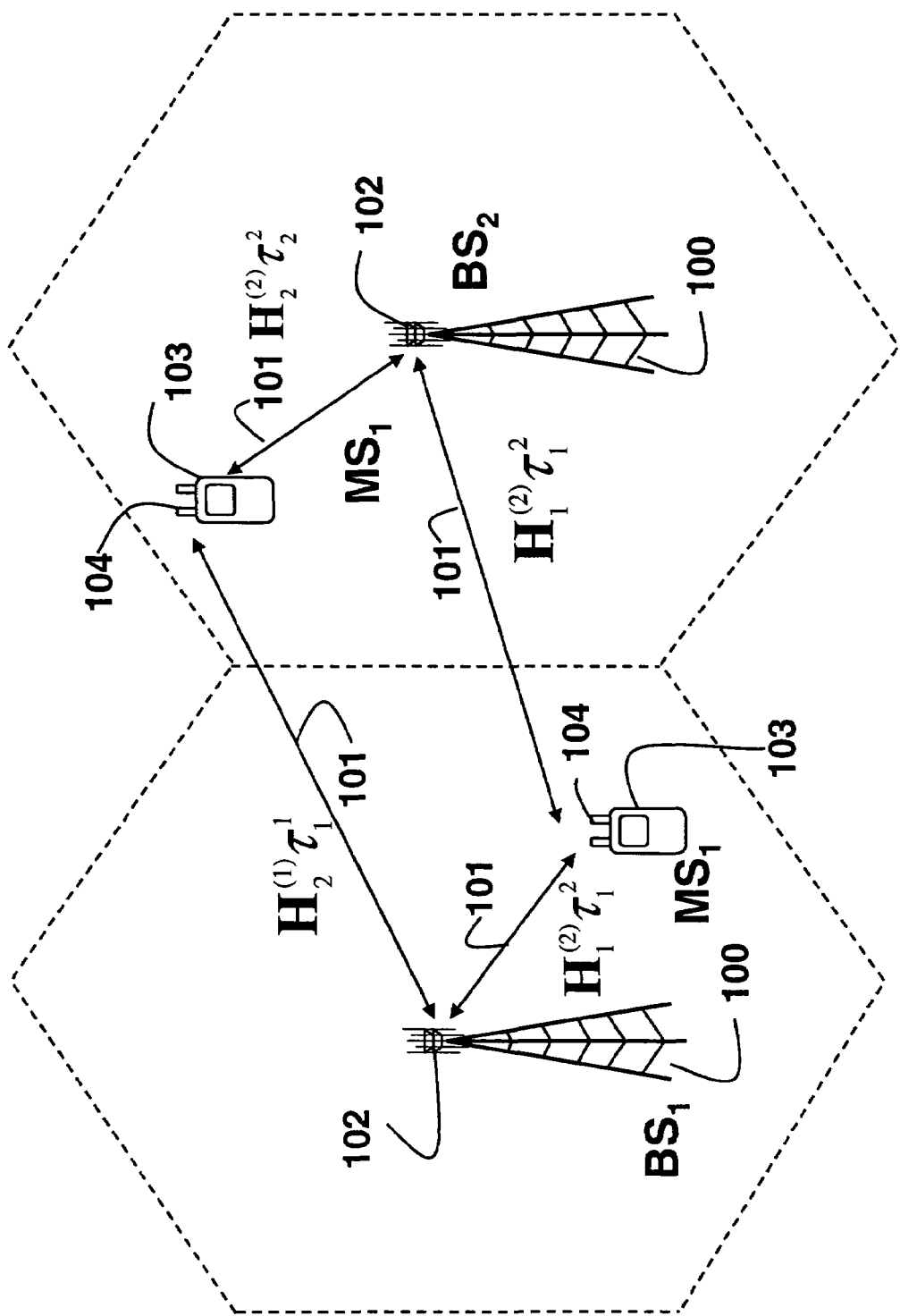
FIG. 1 is a schematic of a multi-user, multi-input, multi-output communications network according to an embodiment of the invention.

FIG. 1 shows a cooperative base station, multi-user, multi-input, multi-output network according to an embodiment of our invention. The network includes B base stations (BSs) 100. Each BS has $N_T$ antennas 102, where T is greater than one. The base stations transmit signals 101 in a cooperative manner. There are also K mobile stations (MSs) 103. Each MS has $N_R$ antennas 104, where R is one or more. For example, the base station is located at a cellular site, and the mobile stations (users) are cellular transceivers ('cell phones'). Each station can transmit or receive radio signals. The signals from the BSs partially overlap as shown in FIG. 1. That is, both $MS_1$ and $MS_2$ can receive signals from both $BS_1$ and $BS_2$.

The basic idea behind the invention is that signals transmitted by multiple base stations to a particular mobile station are synchronous with respect to each other, and asynchronous with respect to signals transmitted by the base stations to any other mobile station.

Figure 4:
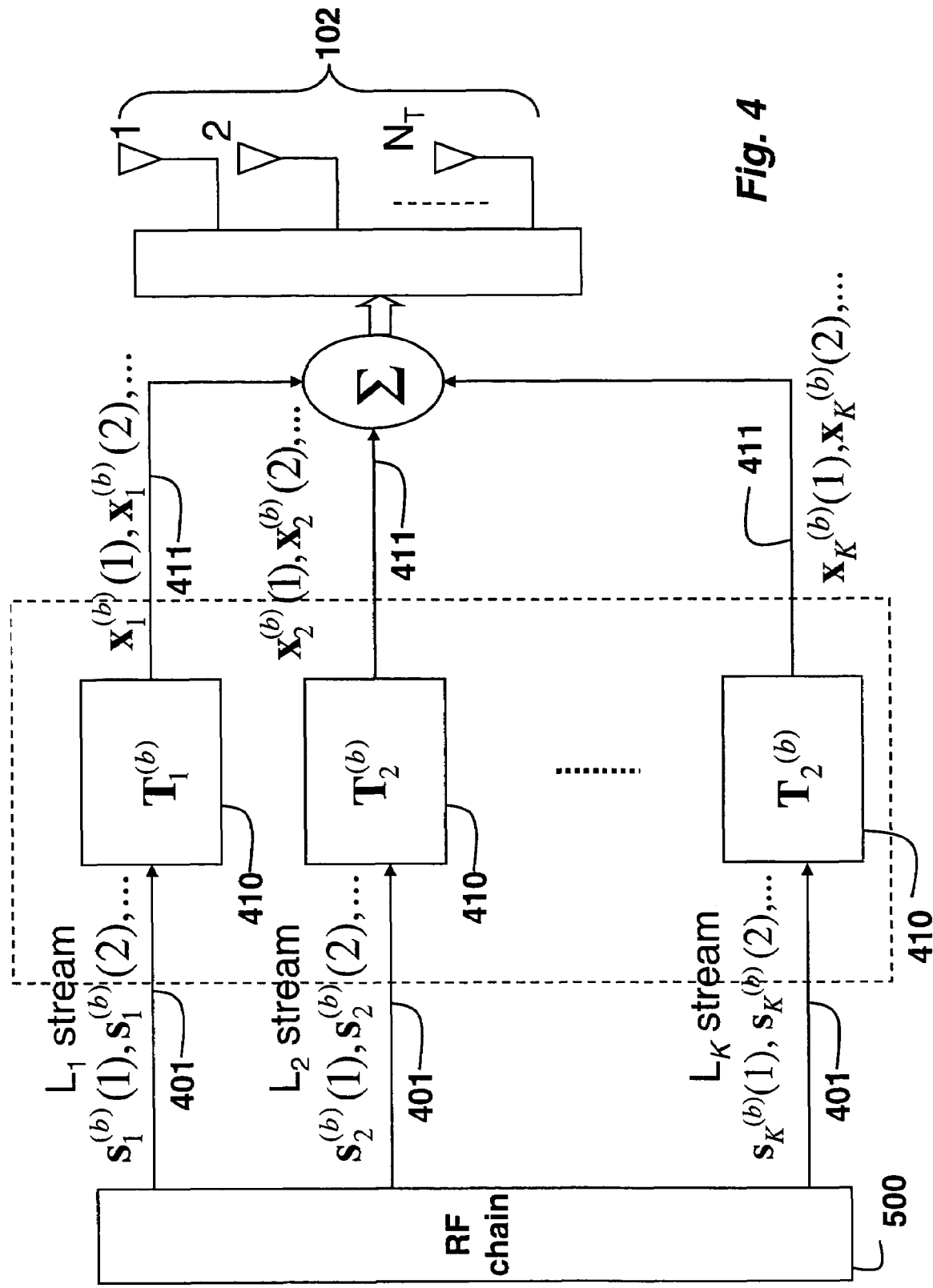
FIG. 4 is a block diagram of the linear pre-coding according to an embodiment.

As shown in FIG. 4, each BS 100 transmits cooperatively $L_k$ data streams 401 to $MS_k$, for k=1, ..., K. In baseband, the data streams 401 are an output of a transmit RF chain 500 and include symbols, which can be drawn from a signal constellation such as well known modulation formats, e.g., QPSK, M-QAM, etc. Such chains use what is known as finite modulation alphabets.

Figure 5:
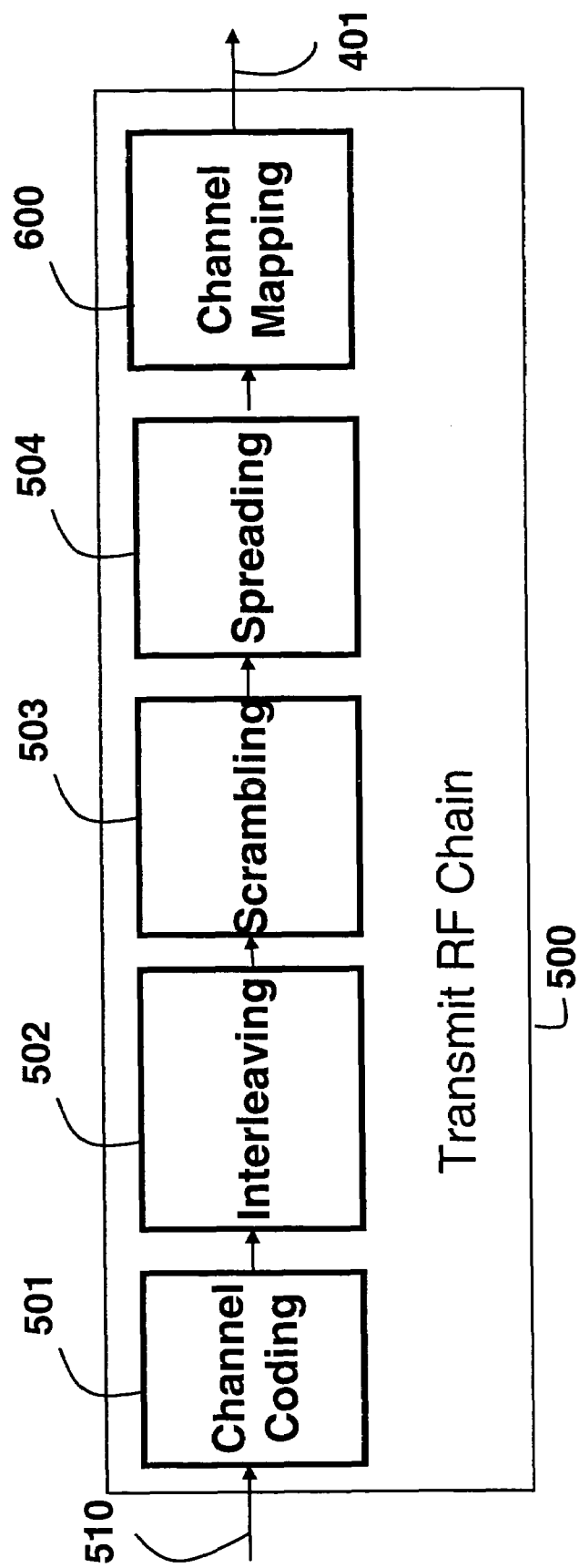
FIG. 5 is a block diagram of a transmit RF chain according to an embodiment of the invention.
Figure 6:
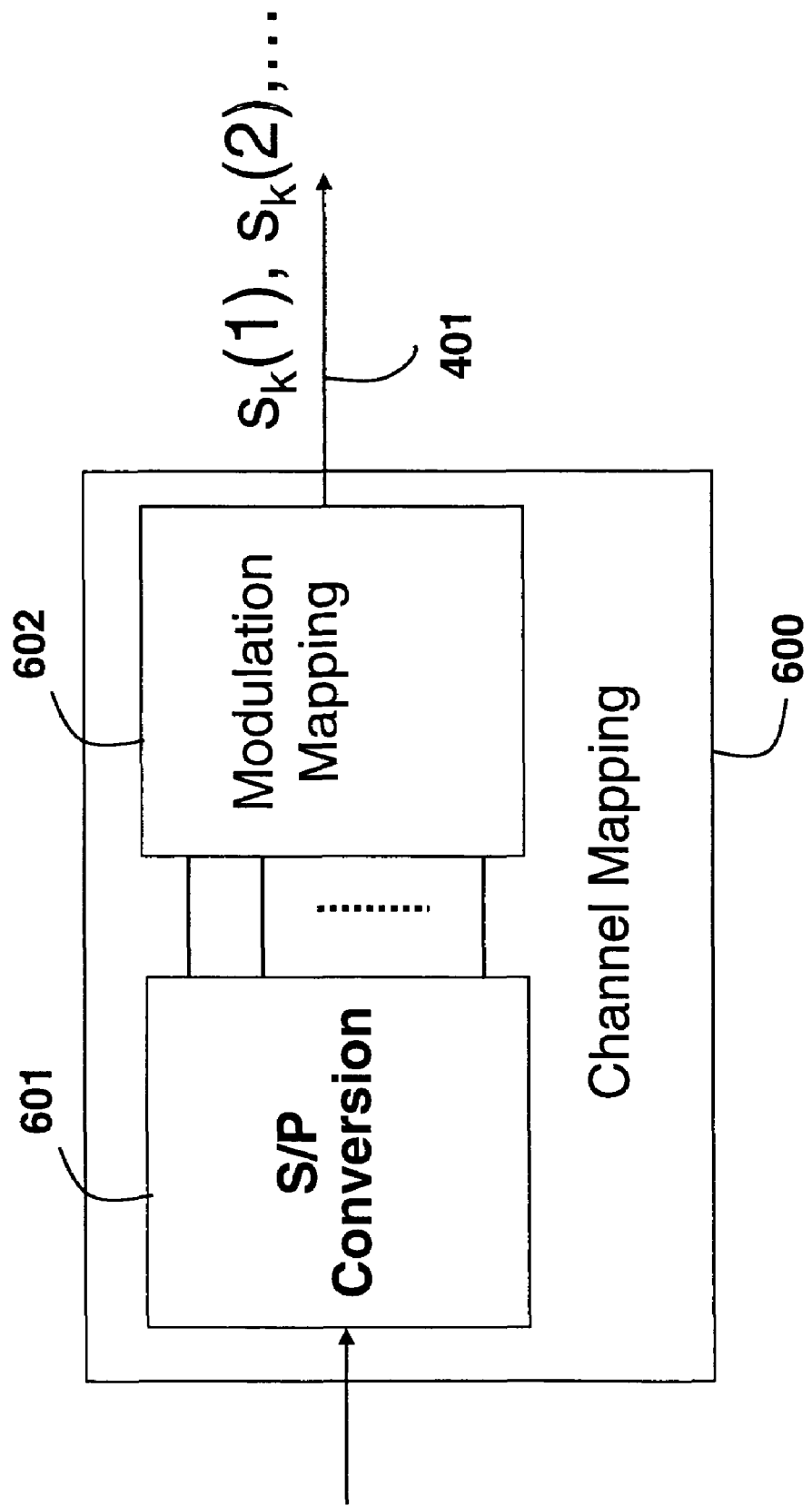
FIG. 6 is a block diagram of a channel mapping module of the transmit RF chain of FIG. 5.

As shown in FIG. 5 for a 3GPP downlink channel, the transmit RF chain 500 can include the following stages: channel coding 501, interleaving 502, scrambling 503, spreading 504, and channel mapping 600. The input is some signal 510, e.g., a signal derived from a microphone in a cellular telephone, and the outputs are the data streams 401. FIG. 6 shows the channel mapping stage 600, which includes a serial to parallel module 601, and a modulation mapper 602.

Referring back to FIG. 4, the data streams 401 are transcoded 410, as described herein, so that the transcoded signals 411 arrive synchronously at an intended mobile station, and asynchronously at other, non-intended mobile stations.

Cooperative transmitting means that the signals are synchronous. The links (channels) 101 between the different transmit and receive antenna pairs are assumed to be independent of each other and undergo frequency-flat Rayleigh fading. Therefore, $H_k^{(b)}$, the base-band representation of the channel from $BS_b$ to $MS_k$, has Gaussian independent identically distributed (i.i.d.) entries. Let $b_k$ denote the index of the BS closest to the $MS_k$.

For any MS, the BSs cooperate and synchronously transmit the signals intended for the MS. As stated above, we use joint linear pre-coding at the BSs. The transmit vector (signal) for $MS_k$ from $BS_b$ is linearly pre-coded using the matrix $T_k^{(b)}$ of size $N_T \times L_k$. The transmit vector takes a form $x_k^{(b)}(m) = T_k^{(b)} s_k(m)$, where $s_k(m)$ denotes the $m^{th}$ zero-mean data vector, of size $L_k \times 1$ for $MS_k$.

In a slowly fading environment, we assume that each BS has the required channel state information for all the subchannels to all the MSs. This can be achieved, for example, by an initial joint training phase that involves all the coordinated base stations, or by means of adaptive signal tracking and feedback processes implemented at the MSs.

We assume a block-fading channel model with a large enough coherence time so that the channel fade remains substantially constant over a duration when the pre-coding matrix $T_k^{(b)}$ is used. The coherence time is typically much longer than the propagation delay between any BS-MS pair. In order to maximize the information transmission rate for each MS, a Gaussian code book is used for the transmit data vectors.

Power is normalized according to $E[s_k(m)s_k^H(m)] = I_{L_k}$, where the operator H represents a matrix conjugate transpose, and $I_L$ denotes an L×L identity matrix. The power constraints on the transmitted signals can be defined by the norms of the pre-coding matrices T. Furthermore, the code books for different MSs are independent of each other, i.e., $E[s_k(m)s_l^H(m)] = 0$, for k≠l.

We assume accurate inter-BS synchronization of the transmitted signals, which can be realized by, e.g., the Global Positioning System (GPS) or through on-air signaling methods, M. Capaccioli, and D. Rispo, "A technique to realize base stations on-air frame synchronization in TD-SCDMA system," Proc. IEEE Vehicular Technology Conference, 2003, VTC-Fall 03, vol. 2, pp. 982-986, October 2003; and M. Rudlf and B. Jechoux, "Design of concatenated extended complementary sequences for inter-base station synchronization in WCDMA TDD mode," Proc. IEEE Global Telecommunications Conference, 2001, GLOBECOM 01, vol. 1, pp. 674-679, November 2001, both incorporated herein by reference, or by a wire-line backbone, a technique already in place in CDMA2000 and IS-95 networks to facilitate soft handoffs, H. Dai, A. F. Molisch and H. V. Poor, "Downlink capacity of interference-limited MIMO systems with joint detection," IEEE Trans. Wireless Communications, vol. 3, no. 2, pp. 442-453, March 2004, incorporated herein by reference.

The channel state information (CSI) available at each BS also includes the knowledge of the propagation delay from each BS to each of the MSs. Given synchronous clocks among cooperative BSs, achieved by inter-BS synchronization, this delay knowledge enables the use of the timing-advance mechanism in the downlink.

Specifically, the BSs advance their transmission times in order to ensure that the signals arrive at the desired $MS_k$ synchronously. However, as stated above, due to the broadcast nature of the wireless channel, $MS_k$ also inevitably receives signals intended for other MSs. As elaborated upon above, these signals arrive at $MS_k$ with different delay offsets, and are asynchronous with the data streams intended for $MS_k$.

As shown in FIG. 1 for two BSs and two MSs, the propagation delay from $BS_b$ to $MS_k$ is denoted as $\tau_k^{(b)}$. To guarantee synchronous receptions of the transmitted signal $\{x_k^{(b)}\}_{b=1\ldots B}$ at $MS_k$, the $BS_b$ advances the time when the signal $x_k^{(b)}(m)$ is transmitted by an interval $\Delta\tau_k^{(b)} = \tau_k^{(b)} - \tau_k^{(b_k)}$. This ensures that the transmitted signals $\{x_k^{(b)}\}_{b=1\ldots B}$ arrive at the $MS_k$ with the same delay, $\tau_k^{(b_k)}$. The equivalent received base-band signal at $MS_k$, when a linear modulation with a base-band signature waveform g(t) defined in a range $[0, (\alpha+1)T_s]$ where $\alpha$ is a roll-off factor of the pulse shape, is given by $$r_k(t) = \sum_m \left\{ \sum_b g(t - mT_S - \tau_k^{(b)} + \Delta\tau_k^{(b)}) H_k^{(b)} x_k^{(b)}(m) \right\} +$$

$$\sum_m \left\{ \sum_{\substack{j \\ (j \neq k)}} \sum_b g(t - mT_S - \tau_k^{(b)} + \Delta\tau_j^{(b)}) H_k^{(b)} x_j^{(b)}(m) \right\} + n_k(t)$$

$$= \sum_m g(t - mT_S - \tau_k^{(b_k)}) H_k x_k(m) +$$

$$\sum_m \left\{ \sum_{\substack{j \\ (j \neq k)}} \sum_b g(t - mT_S - \tau_k^{(b)} + \Delta\tau_j^{(b)}) H_k^{(b)} x_j^{(b)}(m) \right\} + n_k(t),$$

where $H_k = [H_k^{(1)}, H_k^{(2)}, \ldots, H_k^{(B)}]$ are all channel matrices from the B BSs to the K MSs, $x_k(m) = [x_k^{(1)}(m)^H, \ldots, x_k^{(B)}(m)^H]^H$ is the jointly transmitted signal, and $n_k(t)$ represents an additive white Gaussian noise vector.

At $MS_k$, the received base-band signal $r_k(t)$ is passed through a filter matched to $g(t - mT_s - \tau_k^{(b_k)})$ to generate channel statistics. Note that the matched filter is also delayed by $\tau_k^{(b_k)}$. The delay is obtained by a symbol synchronization mechanism at the $MS_k$. The autocorrelation of g(t) is denoted as $$\rho(\tau) = \int_0^{(\alpha+1)T_S} g(t)g(t-\tau)\,dt, \text{ with } \rho(0) = 1,$$

and the corresponding received signal component vector at $MS_k$ is $H_k T_k s_k(m)$, where $T_k = [T_k^{(1)H}, T_k^{(2)H}, \ldots T_k^{(B)H}]^H$ are the transmit pre-coding matrices used by the B base stations for $MS_k$.

Then, the total discrete received signal after matched filtering is $$y_k(m) = H_k T_k s_k(m) + \sum_{\substack{j \\ (j \neq k)}} \sum_b H_k^{(b)} T_j^{(b)} i_{jk}^{(b)} + n_k, \tag{1}$$

where $n_k$ is the discrete noise vector satisfying $E[n_k n_k^H] = N_0 I$, and $i_{jk}^{(b)}$ is the asynchronous interference at the $MS_k$ from the signal transmitted by $BS_b$ for $MS_j$. The strength of the interference depends on the delay difference, $\tau_{jk}^{(b)}$, between the timing-advances used by $BS_b$ for $MS_j$ and for $MS_k$:

$$\tau_{jk}^{(b)} = (\tau_k^{(b)} - \Delta\tau_j^{(b)}) - \tau_k^{(b_k)} = \Delta\tau_k^{(b)} - \Delta\tau_j^{(b)}. \tag{2}$$

Figure 2:
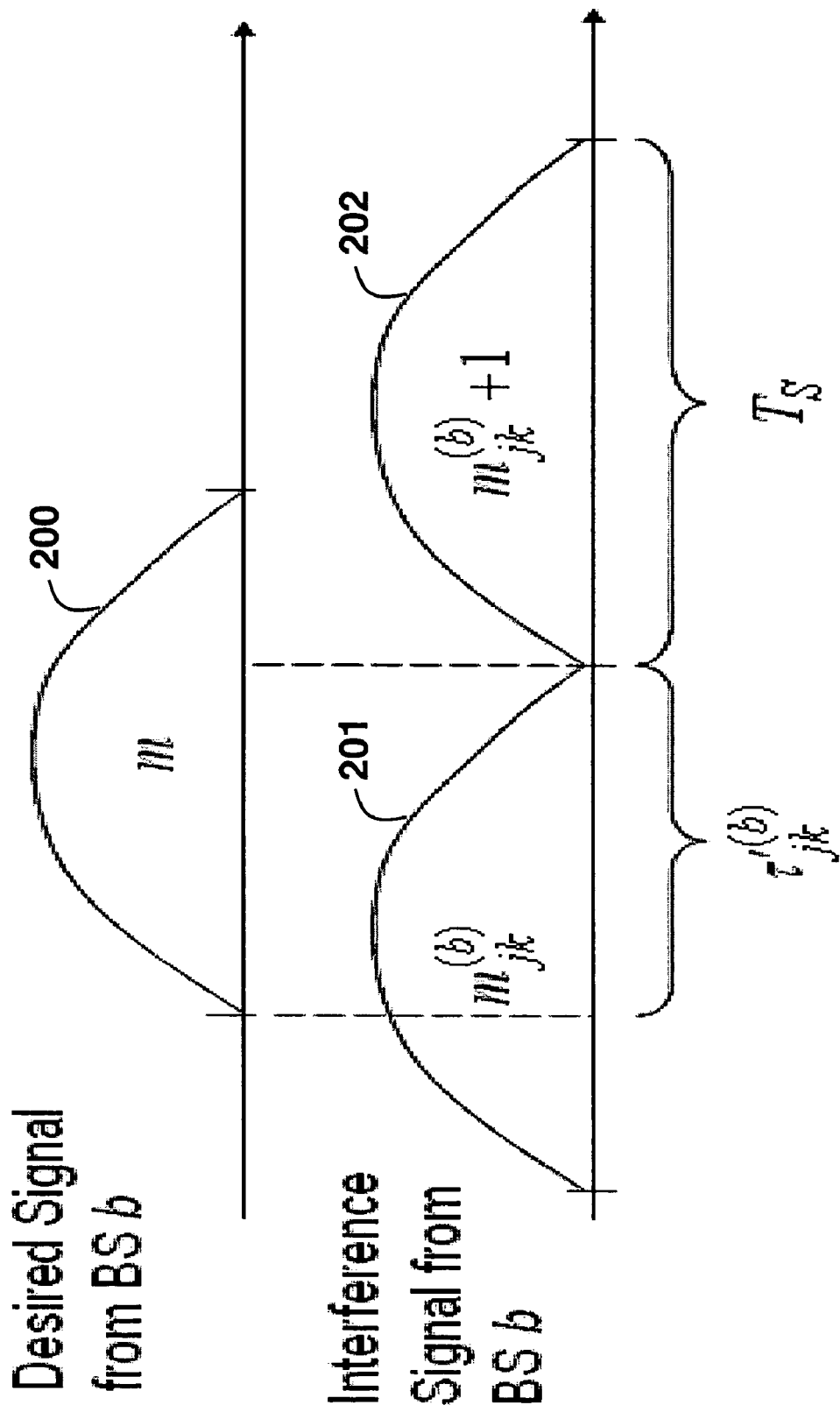
FIG. 2 is a timing diagram of a desired signal and asynchronous interference at a arriving at a mobile station of the network of FIG. 1 according to an embodiment of the invention.

FIG. 2 shows the desired signal m 200 transmitted by $BS_b$, and the asynchronous interference at $MS_k$ due to the signal transmitted by $BS_b$ to $MS_j$, due to two adjacent symbol transmissions 201-202 with indices $m_{jk}^{(b)}$ and $m_{jk}^{(b)} - 1$, where $m_{jk}^{(b)} = m - \lceil \tau_{jk}^{(b)}/T_S \rceil$ and $\lceil x \rceil$ denotes the smallest integer larger than or equal to x. Let $0 \leq \tau'_{jk}^{(b)} \leq T_S$ denote the delay offset $\tau_{jk}^{(b)}$ modulo the symbol duration $T_S$. Then, we have $$i_{jk}^{(b)} = \rho(\tau'_{jk}^{(b)} - T_S) s_j(m_{jk}^{(b)}) + \rho(\tau'_{jk}^{(b)}) s_j(m_{jk}^{(b)} + 1). \tag{3}$$

The first and second moments for the interference $i_{jk}^{(b)}$ are given as follows. From Equation (3), it can be seen that $E[i_{jk}^{(b)}] = 0$. As the information signals intended for two different MSs $j_1$ and $j_2$ are independent of each other, we have $E[i_{j_1 k}^{(b1)} i_{j_2 k}^{(b2)H}] = 0$, for $j_1 \neq j_2 \neq k$.

Moreover, the correlation between $i_{jk}^{(b1)}$ and $i_{jk}^{(b2)}$, for $j \neq k$, is given by $$E[i_{jk}^{(b1)} i_{jk}^{(b2)H}] = \beta_{jk}^{(b1,b2)} I_{L_k}, \tag{4}$$

where $$\beta_{jk}^{(b1,b2)} = \begin{cases} 0, & m_{jk}^{(b2)} > m_{jk}^{(b1)} + 1 \\ \rho(\tau'_{jk}^{(b1)}) \rho(\tau'_{jk}^{(b2)} - T_S), & m_{jk}^{(b2)} = m_{jk}^{(b1)} + 1, \text{ for } j \neq k. \\ \rho(\tau'_{jk}^{(b1)}) \rho(\tau'_{jk}^{(b2)}) + \rho(\tau'_{jk}^{(b1)} - T_S) \rho(\tau'_{jk}^{(b2)} - T_S), & m_{jk}^{(b2)} = m_{jk}^{(b1)} \end{cases} \tag{5}$$

When b1 = b2 = b, we have $\beta_{jk}^{(b,b)} = \rho(\tau'_{jk}^{(b)})^2 + \rho(\tau'_{jk}^{(b)} - T_S)^2$. Furthermore, $\beta_{kk}^{(b1,b2)} = 1$ for all b1 and b2.

We maximize the information rates that can be achieved by linear pre-coding. From Equation (1), the bandwidth-normalized information rate $R_k$ at $MS_k$ is given by $$R_k = \log|I + \Phi_k^{-1} H_k T_k T_k^H H_k^H|, \tag{6}$$

where $\Phi_k$ is the covariance matrix of noise plus interference in Equation (1), and takes the form $$\Phi_k = N_0 I + \sum_{\substack{j \\ (j \neq k)}} \sum_{(b1,b2)} \beta_{jk}^{(b1,b2)} H_k^{(b1)} T_j^{(b1)} T_j^{(b2)H} H_k^{(b2)H}. \tag{7}$$

Because all the K MSs use the same waveform g(t), $$\{\beta_{jk}^{(b1,b2)}\},$$

corresponding different timing parameters can be predetermined and stored in a look-up table. Note that in Equations (6)

and (7), the linear pre-coding matrices $\{T_k\}_{k=1,...,K}$ are functions of the channel matrices $H_1 \sim H_K$, of all the K MSs.

Our goal is to jointly optimize the transmitter pre-coding matrices $\{T_k\}_{k=1...K}$ so as to maximize the sum of information rates over all the K MSs, given the channel state $H_1 \sim H_K$.

To ensure fairness between users, a per-MS power constraint of the following form can be used: $\text{Trace}(T^H_k T_k) \leq P_T$, where the power constraint threshold $P_T$ is predetermined. In addition to ensuring fairness among users, this also has the advantage that it leads to analytically tractable solutions. Another constraint can be a per-BS power constraint, which simplifies the design of the power amplifiers in the BS. The per-MS power constraint is compatible with the per-BS constraint so long as the transmit power allocation for all the involved co-channel MSs does not make each of the cooperative BSs surpass their transmit power upper limit. However, it should be noted that the embodiments of the invention can also be applied to cases where there is no power constraint on the mobile stations or with other power constraints.

An additional constraint follows from the constraints on channel spatial dimensions: $BN_T \geq \Sigma_k L_k$. Therefore, the optimization problem can be defined by a target function $$\{T_{k\_opt}\}_{k=1...K} = \arg\max_{\{T_k\}_{k=1...K}} \left\{\sum_k R_k\right\}, \quad (8)$$

subject to the power constraint $\text{Trace}(T^H_k T_k) \leq P_T$, for $k=1, \ldots, K$.

This optimization problem is non-linear and, even, non-convex. Resorting to conventional brute-force numerical optimizations techniques involves searching over an extremely large space of dimension $BN_T \Sigma_k L_k$. Such techniques include the Nelder-Mead method, J. C. Lagarias, J. A. Reeds, M. H. Wright and P. E. Wright, "Convergence Properties of the Nelder-Mead Simplex Method in Low Dimensions," SIAM Journal of Optimization, vol. 9, no. 1, pp. 112-147, 1998; and a simulated annealing method, L. Shao and S. Roy, "Downlink Multicell MIMO-OFDM: An Architecture for Next Generation Wireless Networks," Proc. IEEE Wireless Communications and Networking Conference (WCNC), March 2005. Those methods are prohibitively expensive computationally and do not provide a viable option.

Therefore, we provide alternative sub-optimal techniques to determine the pre-coding matrices.

One possible solution could be based on a nullification method, G. J. Foschini, H. Huang, K. Karakayali, R. A. Valenzuela and S. Venkatesan, "The value of coherent base station coordination," Proc. 2005 Conference on Information Sciences and Systems (CISS 05), Mar. 16-18, 2005; P. W. Baler, M. Meurer, T. Weber and H. Troeger, "Joint transmission (JT), an alternative rationale for the downlink of time division CDMA using multi-element transmit antennas," Proc. 2000 IEEE 6th Int. Symp. Spread Spectrum Techniques, vol. 1, pp. 1-5, September 2000, and B. L. Ng, J. S. Evans, S. V. Hanly and D. Aktas, "Transmit beamforming with cooperative base stations," Proc. IEEE International Symposium on Information Theory, ISIT 05, pp. 1431-1435, September 2005, all incorporated herein by reference.

That method is widely applied in intra-cell multi-user scenarios due to its simplicity and relatively good performance. The nullification method makes the transmitters satisfy the constraint: $H_k T_j = 0$, $\forall k \neq j$. However, that constraint cannot annul the interference term in Equation (1) due to the inter-cell asynchronous interference described earlier. Thus, significant interference persists.

Another possible option would enforce a stronger per-base station constraint $H_k^{(b)} T_j^{(b)} = 0$ for $k \neq j$, H. Kaaranen, A. Ahtiainen, L. Laitinen, S. Naghian and V. Niemi, UMTS Networks: Architecture, Mobility and Services, Wiley, 2005. While that constraint completely cancels interference, it severely restricts the number of users. Only $K \leq N_T/N_R$ users can be supported, which is clearly undesirable.

Joint Linear Pre-Coding by Cooperative Base Stations

Therefore, according to embodiments of our invention, we provide joint transmitter linear pre-coding methods, which lead to closed-form or simplified solutions. The methods reduce the amount of interference at the input of all the mobile stations. The methods are based on sub-optimal optimization criteria.

We first assume that the timing-advance mechanisms work accurately, so that the desired signals, but not the interference signals, arrive synchronously at each MS. Inaccurate timing-advances, which can even affect the desired signals, are described below.

Joint Wiener Filtering (JWF)

As described above, it is difficult to apply conventional direct optimization and nullification approaches to the signal modeled according to Equation (1). Therefore, our transmitter pre-coding matrices $\{T_k\}_{k=1...K}$ use a Wiener smoothing criterion, such that an overall mean square error (MSE) for all the K MSs is minimized at the input of their receivers.

Figure 7:
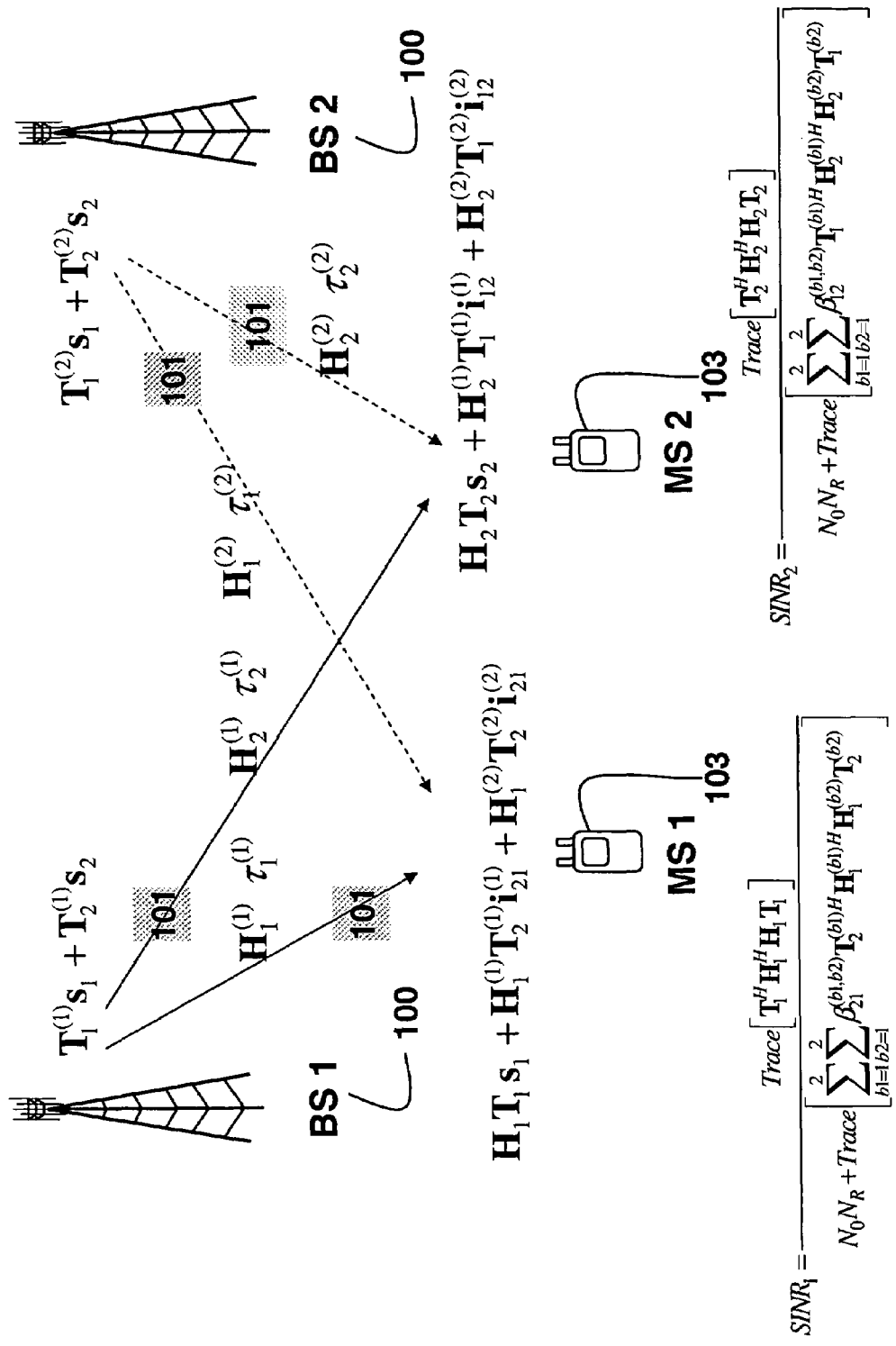
FIG. 7 is a block diagram of signals transmitted at each base station and the SINR at each base station.

FIG. 7 shows the signals transmitted at each base station, and the SINR at each base station. In FIG. 7, the signal $T_1^{(1)} s_1 + T_2^{(1)} s_2$ is sent by $BS_1$, where with $T_1^{(1)} s_1$ is the signal component intended for $MS_1$, and $T_2^{(1)} s_2$ is the signal component intended for $MS_2$. Similarly, the signal $T_1^{(2)} s_1 + T_2^{(2)} s_2$ is transmitted by $BS_2$, where $T_1^{(2)} s_1$ is the signal component intended for $MS_1$ and $T_2^{(2)} s_2$ is the signal component intended for $MS_2$. Then, $MS_1$ receives the first signal $H_1 T_1 s_1 + H_1^{(1)} T_2^{(1)} t_{21}^{(1)} + H_1^{(2)} T_2^{(2)} t_{21}^{(2)}$ and $MS_2$ receives the second signal $H_2 T_2 s_2 + H_2^{(1)} T_1^{(1)} t_{12}^{(1)} + H_2^{(2)} T_1^{(2)} t_{12}^{(2)}$. The signal to interference plus noise ratios at MS1 and MS2 are respectively given by:

$$SINR_1 = \frac{\text{Trace }[T_1^H H_1^H H_1 T_1]}{N_0 N_R + \text{Trace}\left[\sum_{b1=1}^{2}\sum_{b2=1}^{2} \beta_{21}^{(b1,b2)} T_2^{(b1)H} H_1^{(b1)H} H_1^{(b2)} T_2^{(b2)}\right]}$$

$$SINR_2 = \frac{\text{Trace }[T_2^H H_2^H H_2 T_2]}{N_0 N_R + \text{Trace}\left[\sum_{b1=1}^{2}\sum_{b2=1}^{2} \beta_{12}^{(b1,b2)} T_1^{(b1)H} H_2^{(b1)H} H_2^{(b2)} T_1^{(b2)}\right]}$$

JWF has been used in context of intra-cell interference reduction, G. J. Foschini, H. Huang, K. Karakayali, R. A. Valenzuela, and S. Venkatesan, "The value of coherent base station coordination," Proc. 2005 Conference on Information Sciences and Systems (CISS 05), Mar. 16-18, 2005; P. W. Baier, M. Meurer, T. Weber and H. Troeger, "Joint transmission (JT), an alternative rationale for the downlink of time division CDMA using multi-element transmit antennas," Proc. 2000 IEEE 6th Int. Symp. Spread Spectrum Techniques, vol. 1, pp. 1-5, September 2000; and B. L. Ng, J. S.

Evans, S. V. Hanly and D. Aktas, "Transmit beamforming with cooperative base stations," Proc. IEEE International Symposium on Information Theory, ISIT 05, pp. 1431-1435, September 2005, all incorporated herein by reference.

However, extending the JWF technique to our cooperative BS network with asynchronous interference is not at all obvious.

Although our technique is sub-optimal for maximizing the information rate, as an advantage, it avoids a complex iterative process and provides closed-form solutions that exploit the gains of BS cooperation.

To simplify this description, we omit the symbol index m in Equation (1). The received signal vector for over all MSs is $y=[y_1^H, y_2^H, \ldots, y_K^H]^H$, and the data vector over all MSs is $s=[s_1^H, s_2^H, \ldots, s_K^H]^H$. If y and s are of the same dimension, e.g., when $L_k = N_R$ for all k, then the overall network-wide MSE can be expressed as:

$$MSE = E\{\|y - s\|^2\} = \sum_{k=1}^{K} E\{\|y_k - s_k\|^2\} = \sum_{k=1}^{K} MSE_k, \quad (9)$$

where $MSE_k$ stands for the MSE of $MS_k$, and the expectation $E\{\ldots\}$ is over the random data vectors $\{s_k\}_{k=1 \ldots K}$ and the noise, $\{n_k\}_{k=1 \ldots K}$. Then, the optimization criterion becomes:

$$\min_{\{T_k^{(b)}\}_{k=1 \ldots K, b=1 \ldots B}} \sum_{k=1}^{K} MSE_k$$

subject to $$\text{Trace}(T_k^* T_k) = \text{Trace}\left(\sum_{b=1}^{B} T_k^{(b)*} T_k^{(b)}\right) \leq P_T \text{ for } k = 1 \ldots K. \quad (10)$$

If $N_R \neq L_K$ for some k, then the MSE minimization in Equation (9) is not valid. In this case, certain transmitter-dependent and channel-dependent decoding structures need to be assumed at the receivers. This may require complicated iterative processes, see Foschini et al., Baier et al., and Ng et al. above.

By denoting the multi-user interference (MUI) term in Equation (1) as $$J_k = \sum_{\substack{j \\ (j \neq k)}} \sum_{b} H_k^{(b)} T_j^{(b)} t_{jk}^{(b)}, \quad (10.1)$$

the $MSE_k$ is given by:

$$MSE_k = E\{\|y_k - s_k\|^2\} = E\{[y_k - s_k]^H [y_k - s_k]\} \quad (11)$$
$$= E\{[(H_k T_k s_k - s_k) + J_k + n_k]^H$$
$$[(H_k T_k s_k - s_k) + J_k + n_k]\}$$
$$= E\{(H_k T_k s_k - s_k)^H (H_k T_k s_k - s_k)\} +$$
$$E\{J_k^H J_k\} + E\{n_k^H n_k\}$$
$$= \text{Trace}\left\{\sum_{b=1}^{B} H_k^{(b)} T_k^{(b)} T_k^{(b)H} H_k^{(b)H} - \sum_{b=1}^{B} H_k^{(b)} T_k^{(b)} - \right.$$
$$\sum_{b=1}^{B} T_k^{(b)H} H_k^{(b)H}, +$$
$$\left. (N_0 + 1) I_{N_R} + \sum_{j \neq k} \sum_{(b1, b2)} \beta_{jk}^{(b1,b2)} H_k^{(b1)} T_j^{(b1)} T_j^{(b2)H} H_k^{(b2)H}\right\},$$

where we used the identity $E\{J_k^H J_k\} = \text{Trace}\{E[J_k J_k^H]\}$. To solve Equation (10) in closed-form, we apply a Lagrange objective function:

$$A(\{T_k^{(b)}\}_{k=1 \ldots K, b=1 \ldots B}) = \quad (12)$$
$$\sum_{k=1}^{K} MSE_k + \sum_{k=1}^{K} \kappa_k \left[\text{Trace}\left(\sum_{b=1}^{B} T_k^{(b)H} T_k^{(b)}\right) - P_T\right],$$

where $\kappa_1 \sim \kappa_K$ are the Lagrange multipliers associated with the power constraint for MSs 1~K respectively. Therefore, Equation (9) can be solved by minimizing Equation (12).

Using the analysis in Appendix A, we obtain a closed-form solution for the pre-coding matrix $T_k$:

$$T_k = [C_k + \kappa_k I]^{-1} H_k^H, \quad (13)$$

where $c_k$, which corresponds to $MS_k$, is a block matrix of the form $$C_k = \begin{bmatrix} C_k^{(11)} & C_k^{(12)} & \cdots & C_k^{(1B)} \\ C_k^{(21)} & C_k^{(22)} & \cdots & C_k^{(2B)} \\ \vdots & \vdots & \ddots & \vdots \\ C_k^{(B1)} & C_k^{(B2)} & \cdots & C_k^{(BB)} \end{bmatrix}. \quad (14)$$

The submatrices of $C_k$ are given by $$C_k^{(b1b2)} = \begin{cases} \sum_{\substack{j \\ (j \neq k)}}^{K} \beta_{k,j}^{(b1b2)} H_j^{(b1)H} H_j^{(b2)}, & \text{for } b1 \neq b2 \\ \sum_{j=1}^{K} \beta_{k,j}^{(bb)} H_j^{(b)H} H_j^{(b)}, & \text{for } b1 = b2 = b, \end{cases} \quad (15)$$

Appendix A also derives the expression for the Lagrangian multipliers $\kappa_k$. The Lagrange multipliers $\kappa_1 \sim \kappa_K$ are jointly selected to minimize the network-wide MSE in Equation (9).

Joint Leakage Suppression (JLS)

An alternative sub-optimal objective function, which has the advantage of allowing a station-by-station optimization can be obtained by considering interference leakage suppression. For $MS_k$, the pre-coding matrix $T_k$ maximizes a ratio of the power of its desired signal received at $MS_k$ over the sum of the noise and the total power due to 'leakage' of the signal $x_k$ at other MSs. We call this the signal-to-leakage-plus-noise-ratio (SLNR).

This approach minimizes the signal-to-interference-ratio due to data streams intended for another MS instead of the interference that arrives at that MS. This problem is much more general than the simple case of a single data stream per MS and one that does not model BS cooperation with asynchronous interference.

Figure 8:
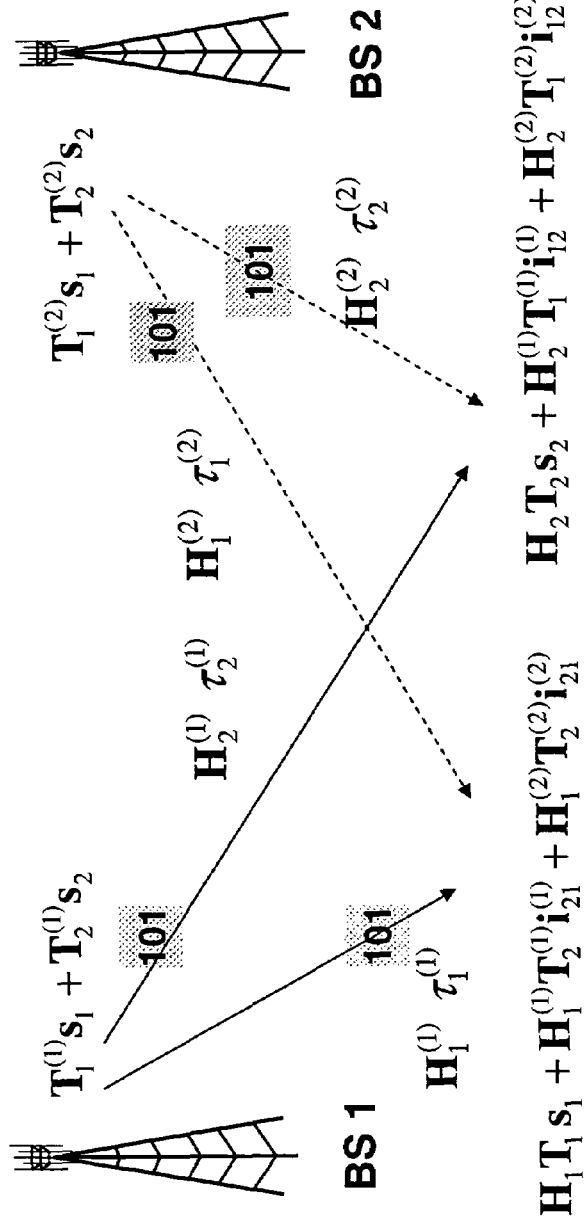
FIG. 8 is a block diagram of signals transmitted at each base station and the SLNR at each base station.

FIG. 8 shows the signals transmitted at each base station, and the SLNR at each base station. In FIG. 7, the signal $T_1^{(1)}s_1 + T_2^{(1)}s_2$ is sent by $BS_1$, where $T_1^{(1)}s_1$ is the signal component intended for $MS_1$, and $T_2^{(1)}s_2$ is the component intended for $MS_2$. Similarly, the signal $T_1^{(2)}s_1 + T_2^{(2)}s_2$ is transmitted by $BS_2$, where $T_1^{(2)}s_1$ is the component intended for $MS_1$ and $T_2^{(2)}s_2$ is the component intended for $MS_2$. Then, $MS_1$ receives the first signal $H_1T_1s_1 + H_1^{(1)}T_2^{(1)}t_{21}^{(1)} + H_1^{(2)}T_2^{(2)}t_{21}^{(2)}$ and $MS_2$ receives the second signal $H_2T_2s_2 + H_2^{(1)}T_1^{(1)}t_{12}^{(1)} + H_2^{(2)}T_1^{(2)}t_{12}^{(2)}$. The signal to leakage plus noise ratios due to the signals of $MS_1$ and $MS_2$ are respectively given by:

$$SLNR_1 = \frac{\text{Trace}[T_1^H H_1^H H_1 T_1]}{N_0 N_R + \text{Trace}\left[\sum_{b1=1}^{2}\sum_{b2=1}^{2} \beta_{12}^{(b1,b2)} T_1^{(b1)H} H_2^{(b1)H} H_2^{(b2)} T_1^{(b2)}\right]}$$

$$SLNR_2 = \frac{\text{Trace}[T_2^H H_2^H H_2 T_2]}{N_0 N_R + \text{Trace}\left[\sum_{b1=1}^{2}\sum_{b2=1}^{2} \beta_{12}^{(b1,b2)} T_1^{(b1)H} H_2^{(b1)H} H_2^{(b2)} T_1^{(b2)}\right]}$$

For analytical tractability, we restrict the set of the pre-coding matrices $T_k$ to be scaled versions of semi-unitary matrices. Thus, $$T_k = \sqrt{\frac{P_T}{L_k}} Q_k,$$

where the $N_T B \times L_k$ semi-unitary matrix $Q_k$ contains orthonormal columns. Orthonormality ensures that there is no crosstalk among the $L_k$ data streams for $MS_k$, and simplifies the detector at $MS_k$. Then, the received signal at $MS_k$ takes the form $$y_k = \sqrt{\frac{P_T}{L_k}} H_k Q_k s_k + \sqrt{\frac{P_T}{L_k}} \sum_{\substack{j \\ (j \neq k)}} \sum_b H_k^{(b)} Q_j^{(b)} t_{jk}^{(b)} + n_k,$$

where the matrix $Q_k^{(b)}$ includes the rows in the matrix $Q_k$ that are associated with the $b^{th}$ BS. Then, the signal component power is given by $$P_k = \frac{P_T}{L_k} E[s_k^H Q_k^H H_k^H H_k Q_k s_k] = \frac{P_T}{L_k} \text{Trace}[Q_k^H H_k^H H_k Q_k]. \quad (16)$$

The asynchronous interference leakage due to the signal $x_k$, i.e., the signal that is meant for $MS_k$ but that is also received at $MS_j$ is $$\sum_b H_j^{(b)} T_k^{(b)} t_{kj}^{(b)}.$$

The power $P_{L\_kj}$ of the signal, is given by $$P_{L\_kj} = E\left[\frac{P_T}{L_k} \sum_{(b1,b2)} t_{kj}^{(b1)H} Q_k^{(b1)H} H_j^{(b1)H} H_j^{(b2)} Q_k^{(b2)} t_{kj}^{(b2)}\right] \quad (17)$$

$$= \frac{P_T}{L_k} \sum_{(b1,b2)} \beta_{kj}^{(b1,b2)} \text{Trace}(Q_k^{(b1)H} H_j^{(b1)H} H_j^{(b2)} Q_k^{(b2)}),$$

The power of the noise at $MS_k$ is $P_{Nk} = N_0 N_R$. Combining Equations (16) and (17), the SLNR for $MS_k$ is given by:

$$SLNR_k = \frac{P_k}{P_{Nk} + \sum_{\substack{j \\ (j \neq k)}} P_{L\_kj}}, \quad (18)$$

$$= \frac{\text{Trace}[Q_k^H M_k Q_k]}{N_0 N_R L_k + \sum_{\substack{j \\ (j \neq k)}} P_T \text{Trace}\left[\sum_{(b1,b2)} \beta_{kj}^{(b1,b2)} Q_k^{(b1)H} H_j^{(b1)H} H_j^{(b2)} Q_k^{(b2)}\right]},$$

$$= \frac{\text{Trace}[Q_k^H M_k Q_k]}{\text{Trace}[Q_k^H N_k Q_k]} = \frac{\sum_{l=1}^{L_k} q_{kl}^H M_k q_{kl}}{\sum_{l=1}^{L_k} q_{kl}^H N_k q_{kl}},$$

where $q_{kl}$ is the $l^{th}$ column of the matrix $Q_k$, $M_k = P_T H_k^H H_k$, and $$N_k = N_0 N_R I + \sum_{\substack{j \\ (j \neq k)}} P_T A_{kj}, \text{ where the matrix } A_{kj} \text{ is given by} \quad (19)$$

$$A_{kj} = \begin{bmatrix} \beta_{kj}^{(11)} H_j^{(1)H} H_j^{(1)} & \beta_{kj}^{(12)} H_j^{(1)H} H_j^{(2)} & \cdots & \beta_{kj}^{(1B)} H_j^{(1)H} H_j^{(B)} \\ \beta_{kj}^{(21)} H_j^{(2)H} H_j^{(1)} & \beta_{kj}^{(22)} H_j^{(2)H} H_j^{(2)} & \cdots & \beta_{kj}^{(2B)} H_j^{(2)H} H_j^{(B)} \\ \vdots & \vdots & \ddots & \vdots \\ \beta_{kj}^{(B1)} H_j^{(B)H} H_j^{(1)} & \beta_{kj}^{(B2)} H_j^{(B)H} H_j^{(2)} & \cdots & \beta_{kj}^{(BB)} H_j^{(B)H} H_j^{(B)} \end{bmatrix}.$$

The optimization of the pre-coding matrices $T_1, \ldots, T_K$ is decoupled. Even so, directly maximizing Equation (18) with respect to $q_{k1} \sim q_{kL_k}$ is still intractable. Therefore, we derive a lower bound that can be maximized analytically. Based on an inequality property, the $SNLR_k$ in Equation (18) can be lower bounded as:

$$SLNR_k \geq \min_{l=1 \ldots L_k} \left(\frac{q_{kl}^H M_k q_{kl}}{q_{kl}^H N_k q_{kl}}\right). \quad (20)$$

Then we derive the following lemma:

Lemma:

The following values for the columns $q_{k1} \sim q_{kL_k}$ maximizes the lower bound of the $SLNR_k$ in Equation (20):

$$q_{kl} = v_l(N_k^{-1} M_k), \quad (21)$$

where $v_l(A)$ represents the eigenvector of the matrix A corresponding to the $l^{th}$ largest eigenvalue.

Proof:

Because $q_{kl} \sim q_{kL_k}$ are orthonormal vectors, the vector space $V = \text{span} \{q_{kl} \sim q_{kL_k}\}$ has a dimension dim $V = L_k$. Because the matrix $M_k$ is Hermitian and $N_k$ is positive-definite, the Courant-Fischer Max-Min theorem can be applied, J. R. Schott, Matrix analysis for statistics, $2^{nd}$ ed, Wiley, 2004; C. D. Meyer, Matrix analysis and applied linear algebra, SIAM, 2000; and G. Golob and C. V. Loan, Matrix computations, $3^{rd}$ edition, The John Hopkins University Press, 1996, incorporated herein by reference.

Then, the maximum value of the lower bound in Equation (20) is given by $$\max_{q_{k1} \sim q_{kL_k}} \left\{ \min_{l=1...L} \left( \frac{q_{kl}^H M_k q_{kl}}{q_{kl}^H N_k q_{kl}} \right) \right\} = \max_V \left\{ \min_{\substack{q \in V \\ \dim V = L_k}} \left( \frac{q^H M_k q}{q^H N_k q} \right) \right\} \quad (22)$$

$$= \lambda_{L_k}(N_k^{-1} M_k),$$

where $\lambda_L(A)$ is the $L^{th}$ largest eigenvalue of the matrix A. By inspection, Equation (21) satisfies Equation (22) in equality.

Consequently, the single closed-form solution in Equation (21) makes it less complex than JWF, c.f. Appendix A.

As a special case, when $L_k = 1$, Equation (18) can be maximized directly by applying the Rayleigh-Ritz quotient theorem. This reduces to $$SLNR_k = \frac{q_{k1}^H M_k q_{k1}}{q_{k1}^H N_k q_{k1}} \leq \lambda_1(N_k^{-1} M_k). \quad (23)$$

It is worthwhile to note similarities between SLNR and SINR, which is actually the more relevant metric to optimize. In the expression for SINR for $MS_k$, $$SINR_k = \frac{P_k}{P_{Nk} + \sum_{\substack{j \\ (j \neq k)}} P_{L\_jk}} \quad (24)$$

$$= \frac{\text{Trace}[Q_k^H M_k Q_k]}{N_0 N_R + \sum_{\substack{j \\ (j \neq k)}} \text{Trace}\left[\sum_{(b1,b2)} \beta_{jk}^{(b1,b2)} Q_j^{(b1)H} H_k^{(b1)H} H_k^{(b2)} Q_j^{(b2)}\right]},$$

the interference power term in the denominator sums over the different pre-coding matrices $T_K$ of different MSs, while the channel realization term is the same. On the other hand, the leakage power of $SLNR_k$ in Equation (18) sums over the different channels associated with different MSs, while the pre-coding matrix is the same. SINR and SLNR are random variables, as they are functions of the channel state, which is a random variable. It turns out that for two MSs, K=2, $SINR_k$ and $SLNR_k$ are identically distributed. The fact that the overall amount of power of the interference equals that of the power of interference leakage, suggests that the JLS method described above is still effective for inter-cell interference reduction.

Controlled Iterative Singular Value Decomposition (CISVD)

The two above described embodiments provided closed-form solutions by optimizing metrics different from the sum-rate spectral efficiency metric in Equation (8). Most prior art for intra-cell interference reduction methods use iterative processes, based on a certain criterion, such as maximum sum rate, minimum signal-to-interference-plus-noise-ratio (SINR), minimum power, or iterative optimizations with gradient descend. However, in general, those processes suffer from non-convexity issues that result in suboptimum local solutions, instead of a global optimal solutions, and require a search for appropriate initial points, and are not designed for inter-cell interference.

To directly improve the spectral efficiency in our cooperative BS network, while keeping acceptable computational complexity, we describe an iterative method to optimize the target function of Equation (8), as shown in FIG. 3.

In step 1, determine the pre-coding matrices $T_1, \ldots, T_k$ for $k=1, \ldots, K$ with Equation (21) for all mobile stations K.

In step 2, each pre-coding matrix $T_k$ is optimized independently, while keeping all other pre-coding matrices $\{T_j\}_{j \neq k}$ fixed.

In step 3, determine if a termination condition is reached, e.g., an increase in a value of the target function in Equation (8) is less than a pre-defined threshold, and otherwise repeat step 2.

Each step is a conventional singular value decomposition (SVD) on the pre-coding matrix, and a conventional water-filling power allocation on an equivalent matrix $H_{k\_equ} = \Phi^{-1/2} H_k$, with unit additive noise power.

Given the non-linear nature of the problem, the iterations are continued only as long as the target function increases, or the increase is less than a predetermined threshold. The starting point also plays an important role for the optimization. The iterations are initialized with the solution in Equation (21). The whole process can be interpreted as a "hill climbing" process, or a controlled iterative SVD (CISVD).

These steps guarantee that the process terminates. Compared with conventional random or exhaustive search process, our method intentionally optimizes one pre-coder in each step to improve the performance of the corresponding MS, while imposing a relatively low level of interference on other MSs.

Generalization to Inaccurate Timing-Advance Case

When the timing advance is accurate, the joint BS pre-coding methods described above ensure that the desired signal components arrived synchronously. However, inaccurate timing advances are inevitable in practical cooperative base station MIMO networks, because of errors in delay estimation, station mobility, and inaccurate BS and MS synchronization.

The timing advance error or jitter of $BS_b$ in sending the signal for $MS_k$ is denoted by $J_k^{(b)}$. Therefore, $BS_b$ advances the time when the signal $x_k^{(b)}(m)$ for $MS_k$ is transmitted by an time interval offset $$\Delta \tilde{\tau}_k^{(b)} = \tau_k^{(b)} - \tau_k^{(bk)} + J_k^{(b)} = \Delta \tau_k^{(b)} + J_k^{(b)}. \quad (25)$$

The joint and marginal statistics of the jitters are assumed to be known at the cooperative base stations. Consequently, the delay offset at $MS_k$ due to the signal transmitted by $BS_b$ for $MS_j$ is $$\tilde{\tau}_{jk}^{(b)} = \Delta \tau_k^{(b)} - \Delta \tilde{\tau}_j^{(b)}. \tag{26}$$

In addition to the MUI term, $J_k$ in Equation (10.1), inaccurate timing advances also result in inter-symbol interference (ISI). By applying Equation (25), Equation (1) is modified to $$y_k(m) = \sum_b \gamma_k^{(b)} H_k^{(b)} T_k^{(b)} s_k(m) + \sum_b \alpha_k^{(b)} H_k^{(b)} T_k^{(b)} s_k\left(m_k^{(b)}\right) + \tag{27}$$
$$\sum_{\substack{j \\ (j \ne k)}} \sum_b H_k^{(b)} T_j^{(b)} \tilde{t}_{jk}^{(b)} + n_k$$
$$= H_k \Lambda_k T_k s_k + O_k + J_k + n_k,$$

where $$\gamma_k^{(b)} = \rho\left(-J_k^{(b)}\right) \le 1, \; O_k = \sum_b \alpha_k^{(b)} H_k^{(b)} T_k^{(b)} s_k\left(m_k^{(b)}\right)$$

is the ISI term with $\alpha_k^{(b)}$ and $m_k^{(b)}$ given by $$\{\alpha_k^{(b)}, m_k^{(b)}\} = \begin{cases} \{\rho(T_S - J_k^{(b)}), m+1\}, & \text{if } J_k^{(b)} > 0 \\ \{\rho(-T_S - J_k^{(b)}), m-1\}, & \text{if } J_k^{(b)} < 0 \\ \{0, m\}, & \text{if } J_k^{(b)} = 0. \end{cases}$$

The block diagonal matrix $\Lambda_k = \text{blockdiag}\{\gamma_k^{(1)} I_{N_T} \cdots \gamma_k^{(B)} I_{N_T}\}$ can be interpreted as a power degradation matrix due to inaccurate signal synchronization. It is equal to $I_{NTB}$ for an accurate timing advance.

From Equation (27), the information rate of MS $k$ is:

$$R_k = \log|I + \Phi_k^{-1} H_k \Lambda_k T_k T_k^H \Lambda_k^H H_k^H|, \tag{28}$$

where the covariance of the noise plus interference term now becomes:

$$\Phi_k =$$
$$N_0 I + \sum_{(b1,b2)} \alpha_k^{(b1)} \alpha_k^{(b2)} H_k^{(b1)} T_k^{(b1)} T_k^{(b2)H} H_k^{(b2)H} 1\left(\text{sgn}\left(J_k^{(b1)}\right) - \text{sgn}\left(J_k^{(b2)}\right)\right) +$$
$$\sum_{\substack{j \\ (j \ne k)}} \sum_{(b1,b2)} \tilde{\beta}_{jk}^{(b1,b2)} H_k^{(b1)} T_j^{(b1)} T_j^{(b2)H} H_k^{(b2)H}.$$

Here the indicator function 1 ( . . . ) equals one if the input argument is zero, and zero otherwise, and sgn(x) is the function $$\text{sgn}(x) = \begin{cases} 1, & x \ge 0 \\ -1, & x < 0. \end{cases}$$

The asynchronous interference coefficients $$\{\tilde{\beta}_{jk}^{(b1,b2)}\}$$

due to the inaccurate timing advances are now determined by $$\{\tilde{\tau}_{jk}^{(b)}\}$$

in Equation (26), in the same way as $\tau_{jk}^{(b)}$ was determined in Equation (5).

The same timing inaccuracy in Equation (25) makes the cooperative BSs have inaccurate timing advance estimation in Equation (26), which leads to errors in the determination of $$\{\tilde{\beta}_{jk}^{(b1,b2)}\}.$$

As we can see from Equations (27) and (28), the timing advance inaccuracy degrades performance due to the power degradation, term $\Lambda_k$, the erroneous estimation of $$\{\tilde{\beta}_{jk}^{(b1,b2)}\},$$

and the additional ISI term $O_k$. While the exact value of the jitter is unknown, its statistics can be determined and exploited by the cooperating BSs to reduce the performance degradation, as follows.

Forms of the JWF and JLS methods that incorporate the timing advance inaccuracy in addition to asynchronous interference leakage are derived in Appendix B.

For JWF, the joint pre-coding matrix of $MS_k$ is:

$$T_k = [C'_k + \kappa_k I]^{-1} \overline{\Lambda}_k H_k^H, \tag{29}$$

where $\overline{\Lambda}_k = \text{blockdiag}\{\overline{\gamma}_k^{(1)} I_{N_T} \cdots \overline{\gamma}_k^{(B)} I_{N_T}\}$. The matrix $C'_k$, which is similar in form to matrix C in Equation (14), has submatrices $$C_k^{\prime(b1b2)} = \tag{30}$$
$$\sum_{\substack{j \\ (j \ne k)}} \overline{\tilde{\beta}}_{kj}^{(b1b2)} H_j^{(b1)H} H_j^{(b2)} + \overline{\alpha_k^{(b1)} \alpha_k^{(b2)}} P_k^{(b1b2)} H_k^{(b1)H} H_k^{(b2)}, \quad \text{for } b1 \ne b2$$
$$\sum_{j=1}^K \overline{\tilde{\beta}}_{kj}^{(bb)} H_j^{(b)H} H_j^{(b)} + \left(\overline{\alpha_k^{(b)2}} + \overline{\gamma_k^{(b)2}}\right) H_k^{(b)H} H_k^{(b)}, \quad \text{for } b1 = b2 = b,$$

where $$\overline{\gamma}_k^{(b)} = E_{J_k^{(b)}}\{\rho(-J_k^{(b)})\},$$

$$\overline{\alpha}_k^{(b)} = Pr(J_k^{(b)} \ge 0) E_{J_k^{(b)}}[\rho(T_S - J_k^{(b)})] +$$
$$Pr(J_k^{(b)} < 0) E_{J_k^{(b)}}[\rho(-T_S - J_k^{(b)})],$$

$$P_k^{b1b2} = Pr\{\text{sgn}(J_k^{(b1)}) = \text{sgn}(J_k^{(b2)})\},$$

$$\overline{\alpha_k^{(b1)} \alpha_k^{(b2)}} = E_{J_k^{(b1)}, J_k^{(b2)}}[\alpha_k^{(b1)} \alpha_k^{(b2)}],$$

-continued $$\overline{a_k^{(b)2}} = E_{J_k^{(b)}}[a_k^{(b)2}],$$

$$\overline{\gamma_k^{(b)2}} = E_{J_k^{(b)}}[\gamma_k^{(b)2}], \text{ and}$$

$$\overline{\tilde{\beta}_{kj}^{(b1,b2)}} = E_{J_k^{(b)}}[\tilde{\beta}_{jk}^{(b1,b2)}].$$

Note that determining the first moment of $$\{\tilde{\beta}_{jk}^{(b1,b2)}\}$$

is difficult due to the modulo $T_s$ operation on $\tilde{\tau}_{jk}^{(b)}$. However, the jitters are typically considerably smaller than the symbol duration. We assume that symbol index differences $$\{m_{jk}^{(b)}\}$$

in Equation (3) do not change. Then, we have $\tilde{\tau}'_{jk}{}^{(b)} = \tilde{\tau}_{jk}{}^{(b)}$ mod $T_s \approx \tau'_{jk}{}^{(b)} + J_k^{(b)}$, and the predictions, denoted as $$\{\overline{\tilde{\beta}}_{jk}^{(b1,b2)}\},$$

are obtained by averaging over the jitters with $\tau'_{jk}{}^{(b)} = \tilde{\tau}'_{jk}{}^{(b)} - J_k^{(b)}$ in Equation (5).

For JLS, the Lemma still holds, but with modified expressions of $M_k$ and $N_k$, denoted by $M'_k$ and $N'_k$, respectively:

$$M'_k = P_T \begin{bmatrix} \overline{\gamma_k^{(1)2}} H_k^{(1)H} H_k^{(1)} & \cdots & \overline{\gamma_k^{(1)} \gamma_k^{(B)}} H_k^{(1)H} H_k^{(B)} \\ \vdots & \ddots & \vdots \\ \overline{\gamma_k^{(B)} \gamma_k^{(1)}} H_k^{(B)H} H_k^{(1)} & \cdots & \overline{\gamma_k^{(B)2}} H_k^{(B)H} H_k^{(B)} \end{bmatrix}, \text{ and} \quad (31)$$

$$N'_k = N_0 N_R I + \sum_{j=1}^{K} P_T A'_{kj},$$

where $A'_{kj}$ bears the same form as in Equation (19), with $\overline{\tilde{\beta}_{kj}^{(b1b2)}}$ replacing $\beta_{kj}^{(b1b2)}$ for j not equal to k, and $\overline{\alpha_k^{(b1)} \alpha_k^{(b2)}} P_k^{(b1b2)}$ replacing $\beta_{kk}^{(b1b2)}$. Note that the asynchronous leakage power from the signals sent by the BSs to $MS_k$ now includes not only of those to MSs $j \neq k$, but also the leakage power to $MS_k$ itself due to ISI.

Effect of the Invention

When cooperative BSs jointly transmit, the interference at a mobile station, due to data streams intended for other stations, is inevitably asynchronous, even when accurate timing advance is used to synchronize the reception of the desired signal component at the mobile station. This can have a significant impact on the network performance.

Therefore, the invention reduces asynchronous interference on downlinks from base stations to mobile stations in cooperative BS MIMO networks.

Embodiments of the invention, described above as CISVD, JLS, and JWF, markedly outperform conventional methods that do not consider asynchronous interference. While CISVD realizes significant performance gains, especially under redundant spatial dimensions, JLS achieves good tradeoff between interference reduction and complexity, and JWF performs well at low to intermediate SNR, or in channels without redundant spatial dimensions.

Embodiments of the invention also reduce the performance degradations caused by timing inaccuracy, by using jitter-statistics-aware pre-coders.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

Appendix A

Derivation of JWF Solution: Equations (13) and (14)

To minimize Equation (12) with respect to the pre-coding matrices $\{T_k^{(b)}\}_{k=1\ldots K, b=1\ldots B}$ of all the K MSs from each of the B base stations, based on a matrix calculus criteria, we apply the following derivatives and set them to zeros:

$$\frac{\partial A}{\partial T_k^{(1)}} = 2 \sum_{\substack{j \\ (j \neq k)}} \sum_{b=1}^{B} \beta_{kj}^{(1b)} H_j^{(1)H} H_j^{(b)} T_k^{(b)} + \quad (32)$$

$$2 H_k^{(1)H} H_k^{(1)} T_k^{(1)} + 2\kappa_k T_k^{(1)} - 2 H_k^{(1)H} = 0$$

$$\frac{\partial A}{\partial T_k^{(2)}} = 2 \sum_{\substack{j \\ (j \neq k)}} \sum_{b=1}^{B} \beta_{kj}^{(2b)} H_j^{(2)H} H_j^{(b)} T_k^{(b)} +$$

$$2 H_k^{(2)H} H_k^{(2)} T_k^{(2)} + 2\kappa_k T_k^{(2)} - 2 H_k^{(2)H} = 0$$

$$\vdots$$

$$\frac{\partial A}{\partial T_k^{(B)}} = 2 \sum_{\substack{j \\ (j \neq k)}} \sum_{b=1}^{B} \beta_{kj}^{(Bb)} H_j^{(B)H} H_j^{(b)} T_k^{(b)} +$$

$$2 H_k^{(B)H} H_k^{(B)} T_k^{(B)} + 2\kappa_k T_k^{(B)} - 2 H_k^{(B)H} = 0,$$

which leads to $C_k T_k + \kappa_k T_k = H_k^H$, and Equations (13) and (14) follows.

To determine $\kappa_k$, based on the a per station power constraint, we apply the eigenvalue decomposition on the Hermitian matrix $C_k$ defined in Equation (14):

$$C_k = U_k \Lambda_k U_k^*,$$

where $\Lambda_k = \text{diag}\{\lambda_{k1}, \lambda_{k2}, \ldots, \lambda_{k(N_T B)}\}$.

By further defining $B_k = U_k^H H_k^H H_k U_k$, we have $$\text{Trace}\{T_k^H T_k\} = \text{Trace}\{(C_k + \kappa_k I)^{-1} H_k^H H_k (C_k + \kappa_k I)^{-1H}\} \quad (33)$$

$$= \text{Trace}\{(\Lambda_k + \kappa_k I)^{-1} B_k (\Lambda_k + \kappa_k I)^{-1}\}$$

$$= \sum_{i=1}^{N_T B} \frac{\lambda_{ki}}{(\kappa_k + b_{ki})^2} = P_T.$$

where $b_{ki} = [B_k]_{ii}$.

Therefore $\kappa_k$ can be determined by taking one of the roots of the formulation $$\sum_{i=1}^{N_T B} \frac{\lambda_{ki}}{(x+b_{ki})^2} = P_T.$$

Note that the determinations of $\kappa_1 \sim \kappa_K$ can introduce some complexity, especially for large values of $N_T$ or B.

Appendix B

Derivations of JWF and JLS Solutions in Equations (29), (30) and (31) with Inaccurate Timing Advance We now express $MSE_k$ based on Equation (27), and average it over $\{J_k^{(b)}\}$, leading to:

$$\overline{MSE_k} = E_{\{J_k^{(b)}\}}[MSE_k] = \text{Trace} \quad (34)$$

$$\left\{ \sum_{b=1}^B \overline{\gamma_k^{(b)2}} H_k^{(b)} T_k^{(b)} T_k^{(b)H} H_k^{(b)H} - \sum_{b=1}^B \overline{\gamma_k^{(b)}} (H_k^{(b)} T_k^{(b)} + T_k^{(b)H} H_k^{(b)H}) + \right.$$

$$(N_0 + 1)I + \sum_{j \neq k} \sum_{(b1,b2)} \overline{\beta_{jk}^{(b1,b2)}} H_k^{(b1)} T_j^{(b1)} T_j^{(b2)H} H_k^{(b2)H} +$$

$$\left. \sum_{(b1,b2)} \overline{\alpha_k^{(b1)} \alpha_k^{(b2)}} P_k^{(b1b2)} H_k^{(b1)} T_k^{(b1)} T_k^{(b2)H} H_k^{(b2)H} \right\}.$$

The Lagrange objective function is $$\Lambda\left(\{T_k^{(b)}\}_{k=1\ldots K, b=1\ldots B}\right) = \quad (35)$$

$$\sum_{k=1}^K \overline{MSE_k} + \sum_{k=1}^K \kappa_k \left[ \text{Trace}\left(\sum_{b=1}^B T_k^{(b)H} T_k^{(b)}\right) - P_T \right],$$

and by performing a similar derivative manipulation as in Equation (32), Equations (29) and (30) are derived.

For JLS, from Equation (27), the power of the received desired signal at $MS_k$, averaged over $\{J_k^{(b)}\}$, can be expressed by:

$$\overline{P_k} = \frac{P_T}{L_k} E_{\{J_k^{(b)}\}}\{\text{Trace}[Q_k^H \Lambda_k^H H_k^H H_k \Lambda_k Q_k]\} \quad (36)$$

$$= \frac{1}{L_k} \text{Trace}[Q_k^H M_k' Q_k],$$

where $M_k'$ follows Equation (31). Furthermore, the leakage power from the transmitted signal $x_k$ to $MS_j$, $j \neq k$, causing MUI at $MS_j$, and to itself, causing ISI at $MS_k$, both averaged over $\{J_k^{(b)}\}$, are respectively written as:

$$\overline{P_{L\_kj}} = \frac{P_T}{L_k} \sum_{(b1,b2)} \overline{\beta_k^{(b1,b2)}} \text{Trace}(Q_k^{(b1)H} H_j^{(b1)H} H_j^{(b2)} Q_k^{(b2)}), \text{ and} \quad (37)$$

-continued $$\overline{P_{L\_kk}} = \frac{P_T}{L_k} \sum_{(b1,b2)} \overline{\alpha_k^{(b1)} \alpha_k^{(b2)}} P_k^{(b1b2)} \text{Trace}(Q_k^{(b1)H} H_k^{(b1)H} H_k^{(b2)} Q_k^{(b2)}). \quad (38)$$

By expressing $$SLNR_k = \frac{\overline{P_k}}{P_{Nk} + \sum_{j=1}^K \overline{P_{L\_kj}}}$$

and applying Equation (20) and the Lemma, we derive Equation (21) with $M_k$ and $N_k$ replaced by $M'_k$ and $N'_k$ in Equation (31), respectively.

We claim:

1. A method for transmitting and receiving signals in a cooperative, multi-user, multi-input, multi-output network, the network including a plurality of base stations and a plurality of mobile stations, and in which each base station has at least two antennas and each mobile station has at least one antenna, comprising:
   pre-coding jointly, at a first base station and a second base station, using linear pre-coding matrices $\{T_k\}_{k=1\ldots K}$, a plurality of data streams to produce first signals and second signals;
   optimizing the pre-coding matrices using numerical optimization techniques, in which the optimizing is subject to a predetermined per mobile station power constraint $P_T$ according $\text{Trace}(T^H_k T_k) \leq P_T$, for $k=1,\ldots,K$, where H is a channel state, and in which K is a number of the mobile stations:
   transmitting synchronously the first signals from the first base station and the second base station to a first mobile station; and
   transmitting synchronously the second signals from the first base station and the second base station to a second mobile station, in which the first signal and the second signal are asynchronous with respect each other.

2. The method of claim 1, in which the plurality of data streams use a finite modulation alphabet.

3. The method of claim 1, in which the plurality of base stations transmit synchronously the signals for an intended mobile station, and the plurality of signals are asynchronous with respect to the signals intended for any other mobile station, and a size of each pre-coding matrix is $N_T \times L_k$, where $N_T$ is a number of antennas at the corresponding base station, and $L_k$ is a number of signals transmitted, and further comprising:
   optimizing the pre-coding matrices to maximize a sum of information rates over all the transmitted signals according to target function $$\{T_{k\_opt}\}_{k=1\ldots K} = \underset{\{T_k\}_{k=1\ldots K}}{\text{argmax}} \left\{ \sum_k R_k \right\},$$

where $T_k$ is a particular pre-coding matrix for one of the k signals, and $R_k$ is the information rate.

4. The method of claim 3, in which the optimizing uses a Wiener smoothing criterion, such that an overall mean square error for all signals received by any subset of the mobile stations is minimized.

5. The method of claim 4, in which each mobile station has $N_R$ antennas, and a received signal vector for all the signals received at all the mobile stations is $y=[y_1^H, y_2^H, \ldots, Y_K^H]^H$, and a data vector over all mobile stations is $s=[s_1^h, s_2^H, \ldots, s_K^H]^H$ and $L_k=N_R$ for all k, and the MSE is $$MSE = E\{\|y-s\|^2\} = \sum_{k=1}^{K} E\{\|y_k - s_k\|^2\} = \sum_{k=1}^{K} MSE_k, \text{ and}$$

an expectation $E\{\ldots\}$ is over the data vector $\{s_k\}_{k=1\ldots K}$ and noise $\{n_k\}_{k=1\ldots K}$, and an optimization criterion is $$\min_{\{T_k^{(b)}\}_{k=1\ldots K, b=1\ldots B}} \sum_{k=1}^{K} MSE_k$$

subject to $$\text{Trace}(T_k^* T_k) = \text{Trace}\left(\sum_{b=1}^{B} T_k^{(b)*} T_k^{(b)}\right) \leq P_T$$

for k=1 ... K, where B is a number of base stations.

6. The method of claim 5, further comprising:
applying a Lagrange objective function $$A(\{T_k^{(b)}\}_{k=1\ldots K, b=1\ldots B}) = \sum_{k=1}^{K} MSE_k + \sum_{k=1}^{K} \kappa_k \left[\text{Trace}\left(\sum_{b=1}^{B} T_k^{(b)H} T_k^{(b)}\right) - P_T\right],$$

where $\kappa_1 \sim \kappa_K$ are Lagrange multipliers associated with the power constraints.

7. The method of claim 1, further comprising:
optimizing the pre-coding matrices to maximize a ratio of power of the first signal received at the first mobile station over a sum of noise and a total power due to the first signal received at other mobile stations.

8. The method of claim 1, further comprising:
optimizing the pre-coding matrices to maximize a ratio of power of the second signal received at the second mobile station over a sum of noise and a total power due to the second signal received at other mobile stations.

9. The method of claim 1, further comprising, in which the pre-coding matrices that are semi-unitary.

10. The method of claim 3, further comprising:
optimizing each pre-coding matrix $T_k$ independently, while keeping all other pre-coding matrices $\{T_j\}_{j \neq k}$ fixed.

11. The method of claim 10, further comprising:
terminating the optimizing if an increase of a value of the target function is less than a predetermined threshold, and otherwise repeating the optimizing step.

12. The method of claim 10, in which the optimizing uses a singular value decomposition of the pre-coding matrix and a water-filling power allocation on an equivalent matrix with unit additive noise power.

13. The method of claim 1, in which the linear pre-coding matrices are jointly optimized to improve a total spectral efficiency of the network.

14. The method of claim 1, further comprising:
optimizing according to timing inaccuracies in the first and second synchronized signals.

15. The method of claim 14, further comprising:
expressing statistically the timing inaccuracies.

16. The method of claim 1, in which the optimizing uses a Wiener smoothing criterion, such that an overall mean square error for all the signals received by the plurality of mobile stations is minimized.

17. The method of claim 14, in which the optimizing maximizes a ratio of power of the first signal received at the first mobile station over a sum of noise and a total power due to the first signal received at other mobile stations.

* * * * *